No. 891,252. PATENTED JUNE 23, 1908.
J. U. HARE.
DITCHING, DIGGING, AND LOADING MACHINE.
APPLICATION FILED AUG. 14, 1907.
2 SHEETS—SHEET 1.
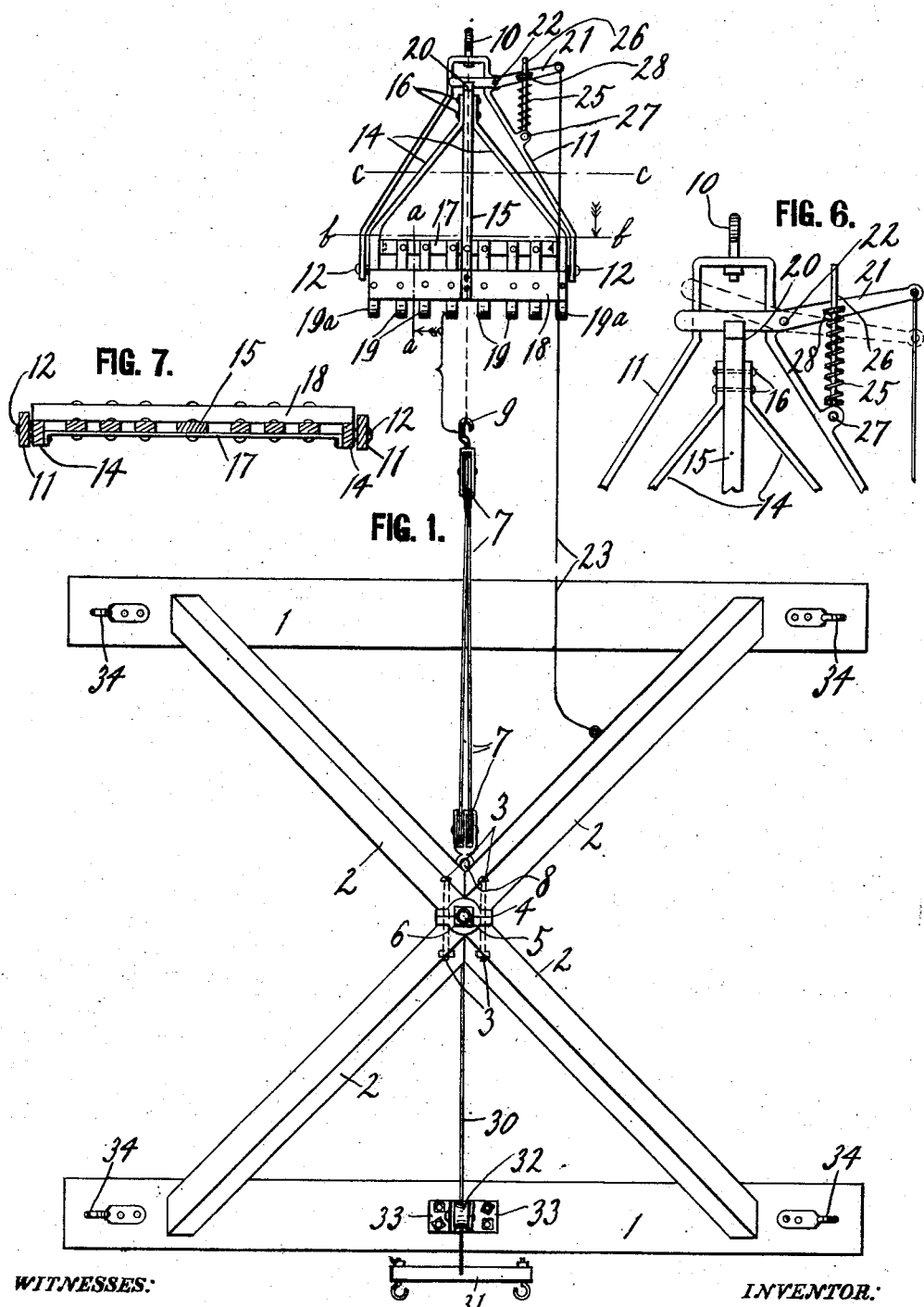
WITNESSES:
D. E. Carlsen
E. C. Carlsen
INVENTOR:
James U. Hare.
BY HIS ATTORNEY:
A. M. Carlsen.

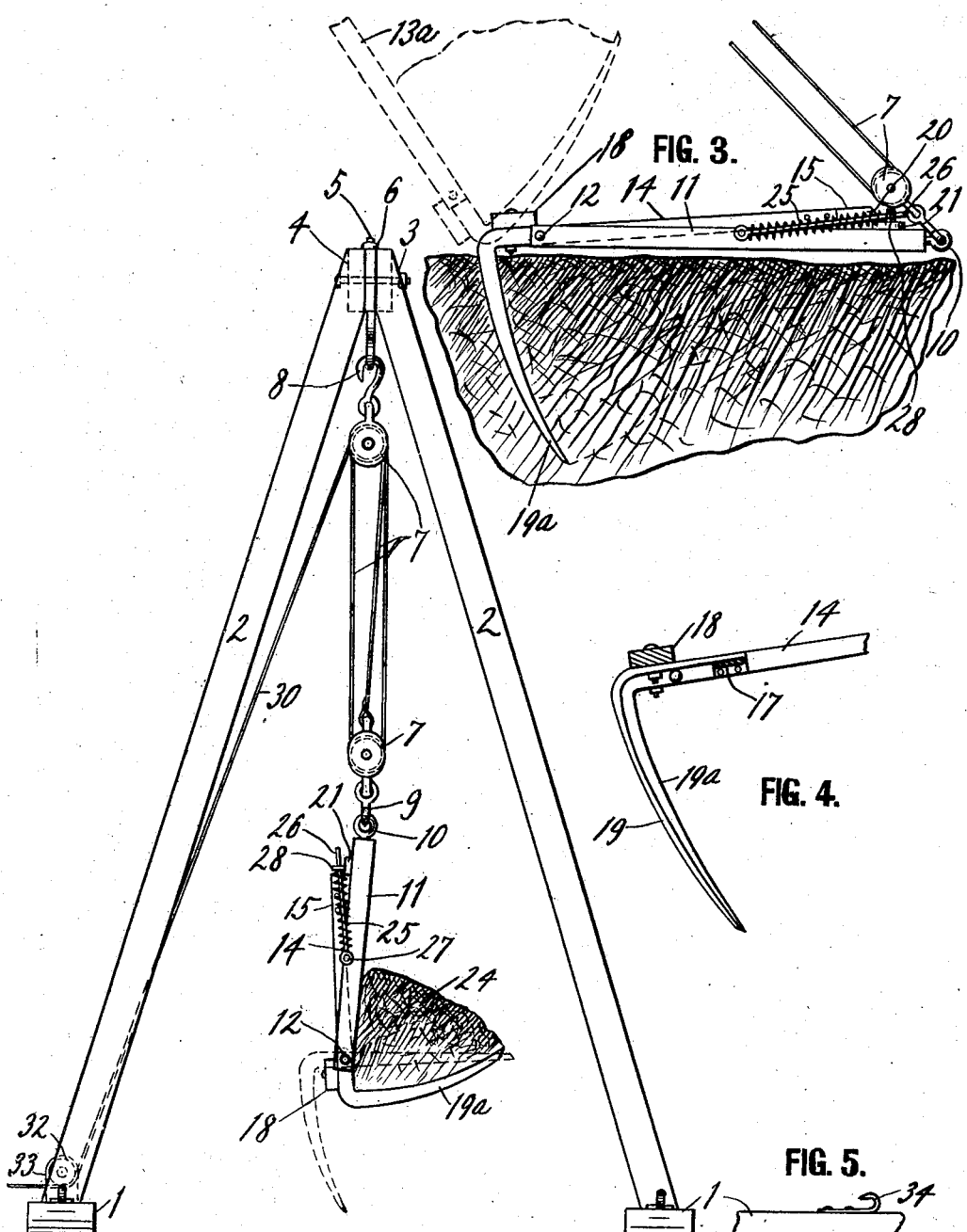

UNITED STATES PATENT OFFICE.

JAMES U. HARE, OF ANOKA, MINNESOTA.

DITCHING, DIGGING, AND LOADING MACHINE.

No. 891,252.

Specification of Letters Patent.

Patented June 23, 1908.

Application filed August 14, 1907. Serial No. 388,558.

*To all whom it may concern:*

Be it known that I, JAMES U. HARE, a citizen of the United States, residing at Anoka, in the county of Anoka and State of Minnesota, have invented a new and useful Ditching, Digging, and Loading Machine, of which the following is a specification.

My invention relates to devices for digging, ditching, excavating and for loading earth, muck, manure and similar substances, and the principal object is to provide a cheap, simple but efficient device of said class.

In the accompanying drawing Figure 1 is a plan or top view of my device with the fork in position to raise a load of earth but, detached from its lifting means. Fig. 2 is an end elevation of the device with the fork loaded and partly elevated from the ground. Fig. 3 is an enlarged side view of the fork in the engaged and in the partly raised position from the ground. Fig. 4 is an enlarged section of the fork on the line *a—a* in Fig. 1. Fig. 5 is a side elevation of an end of one of the runners of the frame. Fig. 6 is an enlarged portion of the upper part of Fig. 1 as above line *c—c*. Fig. 7 is a cross section on the line *b—b* in Fig. 6 and looking in direction indicated by arrow.

Referring to the drawing by reference numerals, a portable frame is formed of two parallel skids or runners 1 and four inclined uprights 2 secured therein with their lower ends and having their upper ends bolted at 3 to a casting 4 having in the middle a hole in which an eye bolt 5 is suspended by its nut 6. In the eye of said bolt is suspended a power-increasing block-and-fall 7 whose upper hook 8 engages said eyebolt, and the lower hook 9 engages the eye 10 of a bail 11, in whose arms is trunnioned at 12 the side bars 14 of an angularly bent fork formed of said bars 14 and a central bar 15 united thereto at 16 and lower down by a metallic cross bar 17. The bars 14 are also secured to a hard wood cross bar 18. To the latter and to bar 17 are secured a series of tines 19 which as well as the tines 19ª formed of the side bars 14 are curved forward several degrees beyond right angle to the bar 14—15 which may be called the handle part of the fork and terminates in a tongue 20, normally resting against the latch 21, pivoted at 22 to the bail or yoke 11. To said latch is attached a cord or chain 32 by which the operator may trip the fork and let its load 24 dump either on the ground inside the frame or into a wagon (not shown) standing between and parallel to the runners. The latch is restored to normal position by a spring 25 guided on a rod 26 pivoted at 27 and guided at 28 in a hole in the latch lever. The tongue 20 is beveled at its end, as best shown in Fig. 3 so that it forces the latch open and engages back of it when the bail is folded down upon the ground after the fork has first been engaged in the ground as shown in Fig. 3.

In the operation of the device the fork is brought beyond one side of the frame, placed upon the ground with the eye top end away from the frame, the tines are then pressed into the ground by stepping on the bar 18 if the ground is soft, or by pounding on the bar with any suitable pounding tool. When the fork is thus fully engaged in the ground and the bail engaged with latch 21 power is applied to the fall 30 of the block and fall or tackle and as the fork is thereby tilted backward to position 13ª in Fig. 3, it brings with it a full charge of earth or other materials, which as already stated, may be dumped in a wagon and hauled away; or in the case of ditching, the earth may be dropped inside the frame; and as fast as the ditching within the range of the fork and frame is completed the frame is drawn forward along the ditch moving on its runners. The moving may be done by hand power or by horses or other motive power; and likewise the rope 30 may be operated by hand or by any available and suitable motive power according to the size of the machine. In Fig. 1 I have shown a whiffle-tree 31 by which a horse may be hitched to the rope, and the latter may be guided by a sheave 32 in a bracket 33 fixed on one of the runners. 34 are hooks on the frame for hitching the horse to in moving the machine.

In the case of digging wells cellars or other deep excavations the frame is placed about centrally over the excavation and the fork pressed down and raised from a lying to a vertical position with its handle portion and then hoisted high enough to let it dump into an inclined chute (not shown) which brings the material outside the frame.

The machine is very handy for the purposes indicated and for many more not mentioned, thus it may be used for loading manure and muck and all kinds of soil and materials used for fertilizing purposes, for dredging and for hoisting and handling materials and goods of almost any description.

Having thus described my invention, what I claim is:

1. In a device of the kind described, a digging and hoisting fork comprising the handle portion 14—15 with tines formed at the lower ends thereof, the two parallel cross bars 17 and 18 secured across the lower end of the handle portion, intermediate tines secured to the front side of the lower cross bar and to the rear side of the upper cross bar, all of said tines being made of metal and bent forwardly at an acute angle below said bars.

2. In a device of the kind described, the combination of a substantially inverted V-shaped hoisting bail, a similarly shaped fork trunnioned therein and having tines standing at an angle to the front side of the fork, a trip lever pivoted to one arm of the bail and having a short arm adapted to normally engage the rear side of the bail and the front side of the upper end of the fork, and a longer arm adapted to be pulled downward by a rope in tripping the fork, said long arm having a guide, a rod pivoted to the hoisting bail and extending into the guide, an expanding coil spring encircling the rod and adapted to return the lever to locking position after tripping.

In testimony whereof I affix my signature, in presence of two witnesses.

JAMES U. HARE.

Witnesses:
C. J. ORTON,
CHAS. W. CATER.